US011486611B2

(12) United States Patent
Regnat et al.

(10) Patent No.: US 11,486,611 B2
(45) Date of Patent: Nov. 1, 2022

(54) CRYOGEN-FREE COOLING APPARATUS

(71) Applicant: kiutra GmbH, Munich (DE)

(72) Inventors: Alexander Regnat, Munich (DE); Jan Spallek, Munich (DE); Christopher Duvinage, Munich (DE); Christian Pfleiderer, Munich (DE)

(73) Assignee: kiutra GmbH, Munich (DE)

( * ) Notice: Subject to any disclaimer, the term of this patent is extended or adjusted under 35 U.S.C. 154(b) by 0 days.

(21) Appl. No.: 15/771,470

(22) PCT Filed: Oct. 26, 2016

(86) PCT No.: PCT/EP2016/075799
§ 371 (c)(1),
(2) Date: Apr. 27, 2018

(87) PCT Pub. No.: WO2017/072174
PCT Pub. Date: May 4, 2017

(65) Prior Publication Data
US 2018/0320936 A1     Nov. 8, 2018

(30) Foreign Application Priority Data

Oct. 28, 2015    (EP) .................................... 15191881

(51) Int. Cl.
*F25B 21/00*     (2006.01)
*F25B 9/10*      (2006.01)
(Continued)

(52) U.S. Cl.
CPC ................ *F25B 21/00* (2013.01); *B01L 7/50* (2013.01); *F25B 9/10* (2013.01); *G01N 1/42* (2013.01); *F25B 9/14* (2013.01); *Y02B 30/00* (2013.01)

(58) Field of Classification Search
CPC .... F25B 9/10; F25B 9/14; F25B 21/00; F25B 2321/001–002; Y02B 30/66; G01N 1/42;
(Continued)

(56) References Cited

U.S. PATENT DOCUMENTS

2002/0040583 A1\*   4/2002   Barclay .................... F25J 1/001
                                                               62/3.1
2005/0229609 A1\*   10/2005   Kirichek ................... F25B 9/02
                                                                 62/6
(Continued)

FOREIGN PATENT DOCUMENTS

JP       H08-097133      4/1996
JP       2003-532861     11/2003
(Continued)

OTHER PUBLICATIONS

International Searching Authority—EPO, International Search Report and Written Opinion, PCT/EP2016/075799; dated Jan. 30, 2017. 12 pages.

*Primary Examiner* — Frantz F Jules
*Assistant Examiner* — Webeshet Mengesha
(74) *Attorney, Agent, or Firm* — Scully, Scott, Murphy & Presser, P.C.

(57) ABSTRACT

The disclosure relates to a cryogen-free cooling apparatus for cooling a sample, comprising a vacuum chamber, a first cooling device which is configured to generate a first temperature in the vacuum chamber to provide a main thermal bath, a second cooling device, which is in connection with a sample stage on which a sample is to be arranged, wherein the second cooling device is a solid state cooler which is configured to provide a second temperature to the sample stage, and wherein the second temperature is different from the first temperature, and a sample loading device which is configured to change the sample while operating the first cooling device and the second cooling device, wherein the
(Continued)

sample stage is held in the vacuum chamber by a plurality of first fibers of low thermal conductivity such that the sample stage is thermally decoupled from the main thermal bath.

14 Claims, 9 Drawing Sheets

(51) Int. Cl.
  *B01L 7/00* (2006.01)
  *G01N 1/42* (2006.01)
  *F25B 9/14* (2006.01)
(58) Field of Classification Search
  CPC .......... B01L 7/50; F25D 19/00; F25D 19/006; H01F 6/00; H01F 6/04
  See application file for complete search history.

(56) References Cited

U.S. PATENT DOCUMENTS

| | | | |
|---|---|---|---|
| 2007/0138388 A1* | 6/2007 | Ward | B82Y 10/00 250/288 |
| 2008/0098752 A1 | 5/2008 | Hohne | |
| 2014/0176136 A1 | 6/2014 | Heiss et al. | |
| 2014/0202179 A1 | 7/2014 | Batey et al. | |
| 2015/0292782 A1* | 10/2015 | Lonzarich | F25B 21/00 62/3.1 |

FOREIGN PATENT DOCUMENTS

| | | |
|---|---|---|
| JP | 2008-14878 | 1/2008 |
| JP | 2008014878 * | 1/2008 |
| WO | WO 01/86218 A2 | 11/2001 |

\* cited by examiner

CRYOGEN-FREE COOLING APPARATUS

FIELD OF THE INVENTION

The disclosure relates to a cryogen-free cooling apparatus for cooling a sample.

BACKGROUND ART

Devices for providing low temperatures are an essential part of fundamental and applied science. Most cooling devices use liquefied gases (so-called cryogens) for generating low temperatures, in particular Nitrogen and Helium. Using cryogens has several disadvantages, for example safety risks as well as considerable efforts for storing and handling the cryogens, and, most importantly, high technical complexity of operation and maintenance. In addition, the price for Helium has raised dramatically in the last years (so-called Helium crisis).

Mainly the latter disadvantage, the high Helium price, has promoted the development of so-called cryogen free cooling devices which do no longer require the addition of liquid cryogens. Though widely accepted the term "cryogen-free", in this context, is somewhat counterintuitive as the vast majority of these new cryogen-free devices still rely on cryogens. This accounts in particular for cooling devices that are used to provide very low temperatures in the range of several milli-Kelvin up to some Kelvin, so-called dilution refrigerators. Recently, dilution refrigerators have been turned cryogen-free by adding cryogen-free mechanical precooling units, e.g. pulse tube coolers or Gifford McMahon coolers. The cryogen-free precooling effectively reduces the working expenses as no more liquid Helium needs to be added upon operation of the device. However, albeit entitled "cryogen-free", these dilution refrigerators are still based on the same cooling technology as any other dilution refrigerator: cooling power is provided by the heat of mixing of 3-Helium and 4-Helium isotopes. These devices thus still rely on cryogens for providing cooling power and, in turn, still suffer from the above mentioned technical disadvantages which go along with the use of cryogens.

There exist some approaches for providing cooling devices which are based on alternative cooling technologies and which, therefore, do not rely on cryogens. Here, cooling technologies based on solid state refrigerants are particularly interesting as they can provide cooling power without the need of moving or circulating a refrigerant, e.g.

magnetic coolers which may be based, e.g., on the magnetocaloric or barocaloric effect of a solid, or
  thermoelectric coolers which may be based, e.g., on the Peltier effect of a solid.

One alternative cooling technology which is based on the magnetocaloric effect is the so-called adiabatic demagnetization refrigeration (ADR). It exploits the magnetocaloric effect of a paramagnetic spin system. Despite being completely cryogen-free this technique so far is scarcely used for providing low temperatures in a laboratory environment. This is due to two limitations: (i) the ADR technique is commonly applied as a single-shot method, i. e. low temperatures may be generated only temporarily until the paramagnetic refrigerant needs to be regenerated for further use. This renders the ADR of limited use for many scientific applications where permanent cooling is essential. (ii) The cooling power which can be achieved by means of the ADR technique in a laboratory apparatus of viable size and costs is small as compared to the prevalent cooling technologies that are based on cryogens. This second limitation prohibits the use of time-saving sample loading devices as changing a sample within a cooling apparatus can only be done if the sample stage (where the sample is to be connected to) is strongly supported within the cooling apparatus. The requirement of a strong mechanical support usually results in large heat leaks which commonly exceed the cooling power of ADR coolers. In summary, rapid sample changing and small cooling powers as provided by the ADR technique have hitherto been mutually exclusive. Of course, this accounts to the same degree for any other cooling technique of small cooling power, e. g. low-temperature Peltier coolers.

Document US 2012/0102975 A1 discloses a cryogen-free cooling apparatus. The apparatus comprises a radiation shield surrounding a working region and is arranged in a vacuum chamber. A cryogen-free cooling stage is coupled to the radiation shield. A pre-cooling of a sample is also provided.

In P. J. Shirron et al., "A multi-stage continuous-duty adiabatic demagnetization refrigerator", 1999 Croygenic Engineering Conference, paper CCB-3, a multi-stage ADR device (ADR—adiabatic demagnetization refrigerator) for cooling a sensor is disclosed.

Document US 2015/0292782 A1 discloses a refrigeration pill for a solid-state refrigerator.

SUMMARY OF THE INVENTION

It is an object to provide improved technologies for cooling a sample to low temperatures.

In one aspect, a cooling apparatus according to claim 1 is disclosed. Further embodiments are subject matter of dependent claims.

A cryogen-free cooling apparatus for cooling a sample is provided, comprising a vacuum chamber, a first cooling device, a sample stage, a second cooling device, and a sample loading device. The first cooling device and the second cooling device are cryogen-free cooling devices. Addition of a liquid cryogen is not needed for operating the first cooling device and the second cooling device. The first cooling device is configured to generate a first temperature in the vacuum chamber to provide a main thermal bath. The second cooling device is in connection with the sample stage on which a sample is to be arranged. The second cooling device is a solid state cooler which is configured to provide a second temperature to the sample stage, wherein the second temperature is different from the first temperature. The second temperature may be higher or lower than the first temperature. The sample loading device is configured to change the sample while operating the first cooling device and the second cooling device. The sample loading device may be configured to change the sample while maintaining the vacuum in the vacuum chamber. The sample loading device may allow a sample change within 30 minutes.

The sample stage is held in the vacuum chamber by a first mechanical suspension of low thermal conductivity such that the sample stage is thermally decoupled from the main thermal bath. The first mechanical suspension may have a thermal conductivity of less than 0.1 W/(K m), e.g. the thermal conductivity may be equal or less than $2.5 \cdot 10^{-4}$ W/(K m). E.g., assuming a temperature of 50 mK of the sample stage and of 500 mK of a sample stage's mounting point, the thermal conductivity of the first mechanical suspension may be low enough to generate a heat leak of less than 25 nW. Due to the low thermal conductivity of the first mechanical suspension, the second cooling device, which is connected to the sample stage, may provide temperatures significantly smaller than the temperature provided by the first cooling device albeit having a very low cooling power. E.g., assuming a temperature of 4 K provided by the first cooling device, the second cooling device may provide temperatures of several mK albeit possibly having a cooling power of some μW. The first mechanical suspension is provided by a plurality of first fibers of low thermal conductivity. The first fibers may have a thickness of less than 0.1 mm or of less than 0.02 mm in diameter. Any suspension which provides a good thermal decoupling is applicable, e.g. fibers or wires such as Polyaramid fibers (e.g. Kevlar, Twaron etc.), Polyamid fibers (e.g. Nylon), stainless steel, platinum-tungsten ($Pt_{92}W_8$) wire, stripes of foil (e.g. Kapton), and thin rods of plastics (e.g. Polyimid Vespel SP5, Vespel SP22), glass or ceramics (e.g. alumina). Following, thermal conductivity data of suitable materials for the low thermal conductivity struts/fibers are presented. The data is taken from "The Art of Cryogenics", Guglielmo Ventura, Lara Risegari (2008). The thermal conductivity K is calculated as $K=a\,T^n$, wherein T is the temperature and a and n are empirically determined parameters. For the range of validity of T cf. "The Art of Cryogenics", Guglielmo Ventura, Lara Risegari (2008).

device. It may comprise several cooling stages, wherein each cooling stage provides a temperature which is different from the temperature provided by the other stages. In one embodiment, the first cooling device may be a two-stage cooling device. A first cooling stage of the first cooling device may be configured to provide a first temperature to the first thermal bath for shielding purposes in the range of 40 K to 70 K. A second cooling stage of the first cooling device may be configured to provide a second temperature to the main thermal bath in the range of 2 K to 4 K. The first cooling device can be considered as a pre-cooling unit.

The second cooling device may be a magnetic cooler, an adiabatic demagnetization refrigerator (ADR), a barocaloric refrigerator, or a thermoelectric cooler, e.g. a Peltier cooler. The adiabatic demagnetization refrigerator may be an orbital ADR or a nuclear ADR. The adiabatic demagnetization refrigerator can also be called an ADR stage.

The second cooling device may be a multi-stage cooling device. E.g., embodiments of the cooling apparatus can have any number of ADR stages between one and eight in the second cooling device. The ADR stages can be arranged in series or in parallel or any combination thereof. Connections between the ADR stages may be provided by heat switches. Hence, a multitude of cooling requirements can be met, e.g.

| Material | a | n | T | K [W/(K cm)] | K [W/(K m)] |
|---|---|---|---|---|---|
| AGOT graphite | 5.10E-006 | 1.76 | 0.1 | 8.86E-008 | 8.86E-006 |
| Polyethylene (PET SH0) | 7.32E-006 | 1.116 | 0.1 | 5.60E-007 | 5.60E-005 |
| Al2O3 (alumina) | 2.90E-004 | 2.7 | 0.1 | 5.79E-007 | 5.79E-005 |
| Polyetheretherketone (PEEK) | 1.87E-005 | 1.47 | 0.1 | 6.34E-007 | 6.34E-005 |
| Vespel SP22 | 1.70E-005 | 2 | 0.2 | 6.80E-007 | 6.80E-005 |
| Teflon | 3.00E-005 | 2 | 0.2 | 1.20E-006 | 1.20E-004 |
| Stycast 2850 FT | 9.20E-005 | 2.65 | 0.2 | 1.29E-006 | 1.29E-004 |
| Nylon | 2.60E-005 | 1.75 | 0.2 | 1.56E-006 | 1.56E-004 |
| Vespel SP5 | 3.00E-005 | 1.73 | 0.2 | 1.85E-006 | 1.85E-004 |
| Kevlar | 3.90E-005 | 1.71 | 0.2 | 2.49E-006 | 2.49E-004 |
| Kel-F | 6.60E-005 | 2 | 0.2 | 2.64E-006 | 2.64E-004 |
| Polymethylmethacrylate (PMMA) | 1.90E-004 | 1.65 | 0.1 | 4.25E-006 | 4.25E-004 |
| Varnish GE7031 | 5.40E-004 | 1.87 | 0.1 | 7.28E-006 | 7.28E-004 |
| Macor | 5.80E-005 | 2.24 | 0.4 | 7.45E-006 | 7.45E-004 |
| Pyrex | 1.50E-004 | 1.75 | 0.2 | 8.97E-006 | 8.97E-004 |
| Kapton | 6.50E-005 | 1 | 0.2 | 1.30E-005 | 1.30E-003 |
| Torlon | 4.00E-005 | 0 | 0.1 | 4.00E-005 | 4.00E-003 |
| SiO2 (Quartz) | 2.40E-004 | 1.87 | 0.4 | 4.33E-005 | 4.33E-003 |
| CuNi 70/30 | 6.40E-004 | 1 | 0.2 | 1.28E-004 | 1.28E-002 |
| Nb—Ti superconductor | 7.50E-005 | 1.85 | 4 | 9.75E-004 | 9.75E-002 |

For all mechanical suspensions described herein which are used to thermally decouple a component from another component or from a thermal bath, the features disclosed for the first mechanical suspension apply.

The sample stage may comprise an electrical connector to establish an electrical connection to the sample. The sample stage may comprise an optical connector to provide an optical access to the sample. The sample stage may comprise several magnetic field and/or temperature sensors. The sample stage may comprise a heater. The sample stage may be used in a cooling apparatus described in this application. Alternatively, the sample stage as described herein may also be used in other cooling devices, e.g. a cooling device using one or more cryogens.

The first cooling device may be a mechanical cooling device, such as a pulse tube refrigerator (or pulse tube cryocooler). Alternatively, the first cooling device may be a Stirling cryocooler or a Gifford-McMahon (GM) refrigerator. The first cooling device may be a multi-stage cooling temporary generation of ultra-low temperatures, continuous generation of very low temperatures, or continuous generation of low temperatures at increased cooling power. The more ADR stages are coupled, the lower the temperature and/or the higher the cooling power that can be provided. In case the second cooling device is a multi-stage cooling device comprising at least three ADR stages, it can be configured to provide ultra-low temperature of several milli-Kelvin (e.g. 50 mK) continuously. In single shot mode, the temperature may be less than 50 mK.

Each ADR stage may comprise a magnet (e.g. a superconducting magnet), a magnetocaloric material serving as an ADR refrigerant, a heat switch, a heater, and one or more magnetic field and/or temperature sensors. If the heat switch is a mechanical heat switch, an actuator which is used to operate the heat switch (e.g. a motor) may also be part of the ADR stage.

The temperatures provided by each individual ADR stage depend on a variety of parameters which can be configured according to the desired cooling characteristics, e.g. number of ADR stages, type and amount of ADR refrigerants used, minimum temperature provided by the main thermal bath and by the thermal baths provided by intermediate ADR stages, and by the magnetic field provided at each individual ADR stage. By tuning these parameters, several cooling requirements can be met, e.g. high cooling power at low temperature, or low cooling power at ultra-low temperature.

In one embodiment of the cooling apparatus, the second cooling device is an adiabatic demagnetization refrigerator which comprises a refrigerant and a superconducting magnet, wherein the superconducting magnet comprises several coils such as to minimize field gradients over the volume of the refrigerant. Further, the second cooling device may comprise at least one compensation coil which is configured to reduce stray fields of the superconducting magnet.

The superconducting magnet of any ADR stage may comprise several coil parts such as to minimize field gradients. Each individual ADR stage may be equipped with an own superconducting magnet. Further, each ADR stage may comprise a compensation coil which is configured to reduce stray fields of the superconducting magnet. In addition, several compensation coils may be used to reduce stray fields. In one embodiment, the superconducting magnet may comprise coil parts in a triple Helmholtz design. A center coil part can be arranged between two identical outer coil parts. The center coil part can be arranged in the center between the outer coils. Hereby, a homogeneous magnetic field can be provided over the full volume of the ADR refrigerant. In addition, a compensation coil may surround the outer coil parts and the center coil part. The compensation coil can reduce stray fields of the triple Helmholtz design.

In another embodiment, the superconducting magnet may be a solenoid. A compensation coil may be used to reduce stray fields of the solenoid. The compensation coil and the solenoid may be wound using a single wire such that both the compensation coil and the solenoid can be operated using a single current supply.

Suitable magnetocaloric materials exhibit a large magnetocaloric effect or have low magnetic ordering temperatures, e. g. iron ammonium alum (FAA), chromium potassium alum (CPA), cerium magnesium nitrate (CMN), lanthanum-diluted CMN, gallium gadolinium garnet (GGG), gadolinium difluoride ($GdF_2$), gadolinium lithium fluoride (GLF), heavy-fermion materials (e.g. $CeCu_6$), materials exhibiting quantum critical fluctuations, high-purity elements (e.g. copper, aluminum), and any combination thereof.

A solid refrigerant of the second cooling device may be arranged in a case having a bottom and a sidewall, wherein the case is formed in a one-piece design and is sealed by a lid.

The refrigerant may be provided as a so-called salt pill. A salt pill does not necessarily need to be filled with a salt (in the chemical sense). The term "salt pill" is also used for other ADR refrigerants, e.g. garnets, metal compounds, pure elements etc. The salt pill may comprise a case. The case may have a cylindrical form. It may be made from stainless steel. The case may have a bottom and a cylindrical side wall which are formed in a one-piece design. The case may be sealed by a lid which may be welded to the case, e.g. by low temperature welding. Inside the case, a thermal matrix and a magnetocaloric material may be arranged. Further, a thermal bus may be arranged in the case. An upper end and a lower end of the thermal bus may protrude at each end of the case. The thermal bus can be made from a material of high thermal conductivity. The thermal matrix may be provided as plates, which may form a regular pattern in the case. Alternatively, two thermal matrixes can be formed which intermesh with each other. The thermal matrix/matrices can be formed from copper. The thermal matrix/matrices and the magnetocaloric material can be arranged in a mirror symmetric manner in the case.

The salt pill may be suspended inside a bore of the ADR stage's magnet by means of a mechanical salt pill suspension of low thermal conductivity. The mechanical salt pill suspension may be provided by a plurality of struts or fibers of low thermal conductivity.

The salt pill may be surrounded by a pill radiation shield. The pill radiation shield may be cylindrical. The pill radiation shield may be made from a high thermal conductivity material. The pill radiation shield may be covered by a superinsulation foil. The pill radiation shield may be thermally anchored to a thermal bath, e.g. another ADR stage, hence reducing the radiation heat leak acting on the salt pill. The pill radiation shield may be suspended from the ADR stage's magnet by means of a mechanical pill radiation shield suspension of low thermal conductivity, e.g. a plurality of low thermal conductivity struts or fibers.

The following procedure may be used for forming salt pills of ADR refrigerants which a liquid solution can be prepared of, e.g. ferric ammonium alum (FAA), cerium magnesium nitrate (CMN), or chromium potassium alum (CPA). A thermal matrix may be provided inside the case. The thermal matrix may be made of a material of high thermal conductivity. The thermal matrix may be rendered inert, e.g. by gold plating. A salt solution of a magnetocaloric material may be filled in the case. From the salt solution, crystals grow forming a solid magnetocaloric material. Then, the lid may be welded to the case in order to seal it. Electron-beam welding or laser-beam welding may be used to keep the temperature of the ADR refrigerant low during welding. A single welding step is needed in this embodiment of the salt pill. The salt pill may be used in the cooling apparatus described herein. It may also be used with other cooling devices based on the ADR principle.

The following procedure may be used for forming pills of ADR refrigerants which a liquid solution cannot be prepared of, e.g. gadolinium gallium garnet (GGG), dysprosium gallium garnet (DGG), gadolinium lithium fluoride (GLF), or copper. A thermal matrix may be provided inside the case. The thermal matrix may be made of a material of high thermal conductivity. The thermal matrix may comprise a rod and discs which sandwich the ADR refrigerant and which are attached to the rod, e.g. by means of low-temperature welding. The thermal matrix may be rendered inert, e.g. by gold plating. The thermal matrix may be covered with a thin layer of grease or indium foil to reduce the thermal resistance between the thermal matrix and the ADR refrigerant. The lid may be welded to the case in order to seal it. Electron-beam welding or laser-beam welding may be used to keep the temperature of the ADR refrigerant low during welding. The salt pill may be used in the cooling apparatus described herein. It may also be used with other cooling devices based on the ADR principle.

The second cooling device may be provided in a modular assembly. E.g., it is possible to initially provide a cooling apparatus with only one ADR stage. Additional ADR stages can be added one after another in order to provide additional operation modes as described above.

The vacuum chamber may comprise a lid, a bottom, and a wall. The bottom and the wall may be manufactured as a single piece forming a vessel. The vessel may be cylindrical.

The vessel may be made of stainless steel. The vacuum chamber may comprise several flanges and valves to evacuate and seal the vessel. The lid of the vacuum chamber may be sealed against the vessel by means of one or more seals. The lid may comprise several openings which may serve as feedthroughs, e.g. for electrical wiring, optical fibers, transmission shafts, attachment of vacuum components, attachment of pre-cooling devices, and sample transfer. The openings may be formed in a way to allow for the attachment of standard vacuum components, e. g. vacuum flanges, vacuum valves etc.

The cooling apparatus may comprise a first radiation shield. The first radiation shield may comprise a lid, a bottom, and a wall. The wall of the first radiation shield may be composed of several cylindrical parts of differing diameters. The first radiation shield may be made of high thermal conductivity material. The first radiation shield may be covered by a superinsulation foil. The first radiation shield may be thermally anchored to a first thermal bath provided by the first cooling device. The first radiation shield may be suspended from the lid of the vacuum chamber by a mechanical first radiation shield suspension, e.g. using low thermal conductivity struts or fibers. Several struts may be connected by means of additional struts, fibers, or plates to increase the mechanical stability of the overall assembly, e. g., against vibration and lateral movement. The first radiation shield may comprise several thermal anchors which provide pre-cooling for wiring and mechanical transmission shafts. The first radiation shield may comprise a first sample feedthrough which allows transferring the sample to the inside of the first radiation shield. A moveable first baffle may be mounted on the lid of the first radiation shield such that the first sample feedthrough may be closed. The first baffle may be operated by a first rotary shaft. A single first rotary shaft may be used to drive multiple baffles at different temperatures. The motion of the first rotary shaft may be driven by a first motor.

The cooling apparatus may comprise a second radiation shield. The second radiation shield may comprise a lid, a bottom, and a wall. The second radiation shield may be cylindrical. The second radiation shield may be made of high thermal conductivity material. The second radiation shield may be covered by a superinsulation foil. The second radiation shield may be anchored thermally to the main thermal bath as provided by the first cooling device. The second radiation shield may be suspended from the lid of the first radiation shield by a mechanical second radiation shield suspension, e.g. using low thermal conductivity struts or fibers. Several struts can be connected by means of additional struts, fibers, or plates to increase the mechanical stability of the overall assembly, e.g. against vibration and lateral movement. The second radiation shield may comprise several thermal anchors which provide pre-cooling for wiring and mechanical transmission shafts. The second radiation shield may comprise a second sample feedthrough which allows transferring the sample to the inside of the second radiation shield. A moveable second baffle may be mounted on the lid of the second radiation shield such that the second sample feedthrough may be closed. The second baffle may be operated by a second rotary shaft. The motion of the second rotary shaft may be driven by a second motor. Alternatively, the first and second baffle may be driven by the same (first or second) rotary shaft and the same (first or second) motor.

The cooling apparatus may comprise a sample magnet which is configured to provide a magnetic field at the sample stage, e.g. at a sample position. The sample magnet may be suspended from the lid of the vacuum chamber by a mechanical sample magnet suspension, e.g. using low-thermal conductivity struts or fibers. The struts may be made of two parts, a first part may be pre-cooled by the first thermal bath as provided by the first stage of the first cooling device, and a second part may be cooled by the main thermal bath as provided by the second stage of the first cooling device.

The sample magnet may be a solenoid, a vector magnet, a permanent magnet, or a split-pair magnet. The sample magnet may be a superconducting magnet. The superconducting sample magnet may be made from a high-temperature superconductor (HTS). The HTS magnet may be enclosed by the first radiation shield and thermally coupled to the first thermal bath as provided by the first cooling stage of the first cooling device. The superconducting sample magnet may also be made from a low-temperature superconductor (LTS). The LTS magnet may be enclosed by the second radiation shield and thermally coupled to the main thermal bath as provided by the second cooling stage of the first cooling device. Current may be supplied to the sample magnet using HTS current leads mounted between the first thermal bath and the main thermal bath to reduce the thermal load.

The cooling apparatus may comprise a thermal bus, i.e. a mechanical assembly which allows connecting components that are enclosed in the vacuum chamber to the main thermal bath. In one embodiment, the thermal bus may be made of a material of high thermal conductivity. Suitable materials for the thermal bus and for all other components described herein referring to high thermal conductivity materials are sapphire, high-purity metals, aluminum, copper, oxygen-depleted copper, silver, gold and annealed versions thereof. It may be manufactured from several parts which are joined by means of welding, electron-beam welding, laser-welding, soldering, brazing, press-fitting, or gluing. Connections to the thermal bus may be made using rigid or flexible connections of high thermal conductivity. In one embodiment, the connections may be copper braiding.

The cooling apparatus may be configured to provide a temperature in a range of several milli Kelvin to 300 K (room temperature).

The cooling apparatus may comprise a sample radiation shield which surrounds the sample stage. The sample radiation shield may be made from a material of high thermal conductivity. The sample radiation shield may be cylindrical. The sample radiation shield may be held in the vacuum chamber by a second mechanical suspension of low thermal conductivity such that the sample radiation shield is thermally decoupled from the main thermal bath. In one embodiment, the second mechanical suspension may be provided by a plurality of second fibers of low thermal conductivity. The sample radiation shield may be thermally anchored to a thermal bath provided by the second cooling device.

The cooling apparatus may further comprise a sample stage locking device which is configured (or can be operated) to retain the sample stage and to provide a thermal link to the main thermal bath while the sample is changed.

In one embodiment, the sample stage locking device may comprise one or more shafts which are movable between an unlocked position and a locked position. In the unlocked position, the one or more shafts are not in contact with the sample stage. In the locked position, the one or more shafts are in contact with the sample stage and hold it in place.

In another embodiment, the sample stage locking device may comprise a clamp which is movable between an unlocked position and a locked position. In the unlocked position, the clamp is not contact with the sample stage. In the locked position, the clamp is in contact with the sample stage and holds it in place.

The sample stage locking device may be operated by means of a motor, either directly or by means of a transmission shaft, a gear drive, a drive belt, a drive chain, or combinations thereof. The sample stage locking device may also be operated by means of a magnetic field.

The sample stage locking device may also be configured for rapid pre-cooling of the sample to the temperature of the main thermal bath thus allowing shorter sample turnover times, and for providing a controlled heat leak for superior temperature stability at temperatures higher than the one of the main thermal bath.

The sample stage locking device may be used for a cooling apparatus as described in this application. Alternatively, the sample stage locking device as described herein may also be used for other cooling devices, e.g. a cooling device using one or more cryogens.

The heat switch may be a mechanical heat switch, a passive gas gap heat switch, an active gas gap heat switch, or a superconducting heat switch. In an embodiment comprising multiple ADR stages, the ADR stage connected to the sample stage may be coupled with its pre-cooling ADR stage via a superconducting heat switch. The other ADR stages may be coupled by mechanical heat switches. A housing of the mechanical heat switch may be thermally decoupled from the thermal main bath by a mechanical heat switch suspension, e.g. using struts or fibers of low thermal conductivity.

BRIEF DESCRIPTION OF THE DRAWINGS

Following, embodiments are disclosed with reference to figures. Here show.

DETAILED DESCRIPTION OF SPECIFIC EMBODIMENTS

Figure 1A:
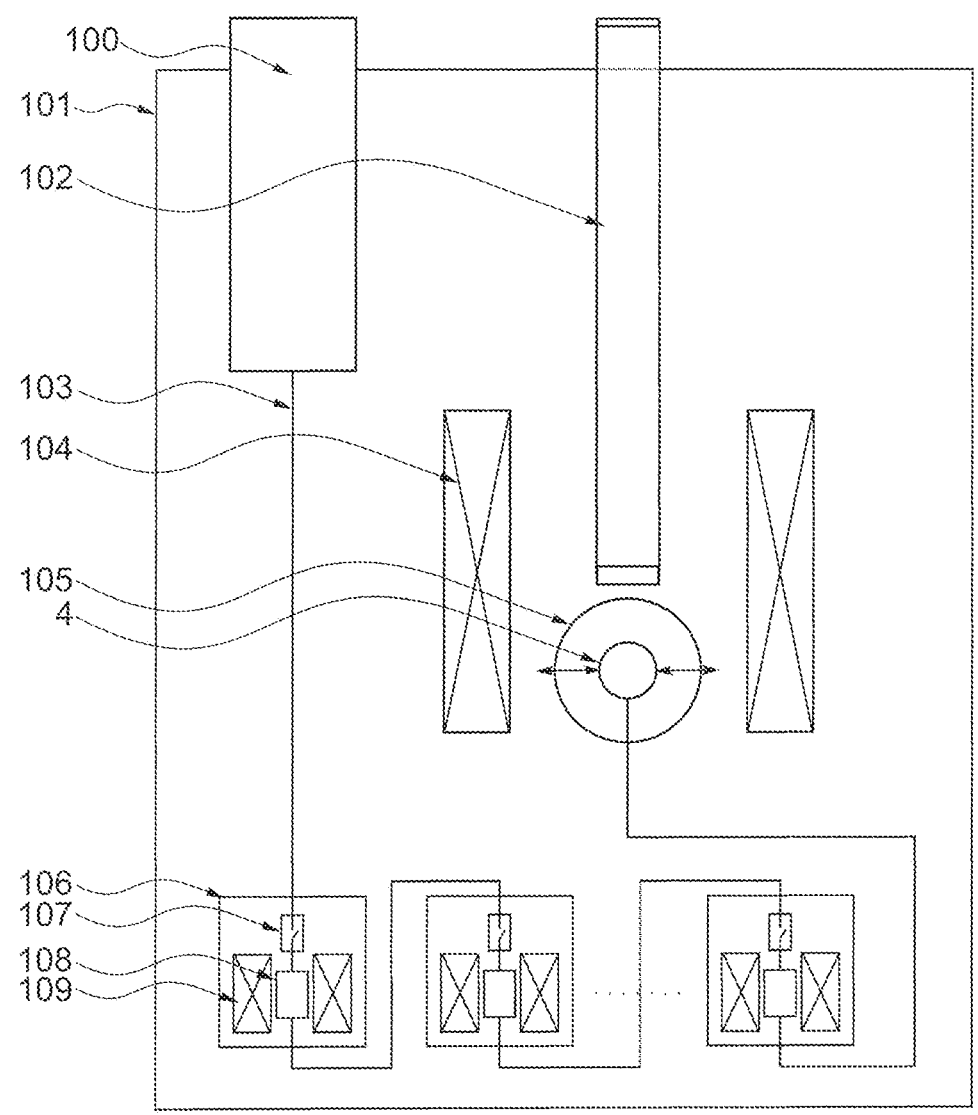
FIG. 1a a schematic view of a cooling apparatus,
FIG. 1b a cooling apparatus,
FIG. 2 a sample stage including a sample radiation shield,
FIG. 3 a sample stage locking device,
FIG. 4 a mechanical heat switch,
FIG. 5 a working principle of the heat switch of FIG. 4,
FIG. 6 a schematic drawing of a suspension mechanism of the heat switch of FIG. 4,
FIG. 7 a superconducting magnet,
FIG. 8 a power connector for the magnet of FIG. 7,
FIG. 9 a frontal view of the combined magnet and power connector,
FIG. 10 a schematic view of a salt pill,
FIG. 11 an overview of the salt pill of FIG. 10, and
FIG. 12 a schematic view of another embodiment of a salt pill.

FIG. 1a shows a schematic drawing of a cooling apparatus. Low temperatures (e.g. 4 K) are provided by a first cooling device 100, e.g. a pulse tube cooler, inside a vacuum vessel 101. A sample can be introduced into the vacuum vessel 101 using a sample loading device 102. The sample is loaded onto a sample stage 4, which can be locked in place by a sample stage locking device 105 (e.g. during loading of the sample). The sample stage 4 is surrounded by a sample magnet 104 used to provide a magnetic field at the position of the sample. A second cooling device can be one or multiple ADR stages 106. There may be any number between one and eight ADR stages 106. Multiple ADR stages 106 can be combined for multi-stage operation. Each ADR stage 106 comprises a heat switch 107, a magnetic refrigerant 108 and a magnet 109, e.g. a superconducting magnet. The first ADR stage 106 is connected to the first cooling device by a high thermal conductivity connection 103 through the heat switch 107. The subsequent ADR stages 106 are connected to each other through their respective heat switches 107. The final ADR stage 106 is coupled to the sample stage 4.

Depending on the number of built-in ADR stages the following main operating modes may be realized:

Single stage operation using a single ADR stage: The refrigerant is magnetized by applying current to the ADR stage's magnet while the heat switch between the main thermal bath and the ADR stage is closed. The heat created by magnetization is absorbed by the main thermal bath. Upon full magnetization and relaxing to the main thermal bath's temperature, the single ADR stage is isolated from the main thermal bath by opening the heat switch and demagnetized by removing the magnetic field. The temperature of the ADR stage and the sample stage connected to it is thereby reduced to a lower temperature depending on the magnetocaloric material used. After the cooling power of the refrigerant is depleted, the system warms up to the temperature of the main thermal bath and the refrigerant has to be remagnetized. This kind of operation is also called single-shot operation.

Multi-stage operation using two or more ADR stages: All ADR stages are magnetized while the respective heat switches are closed. Upon full magnetization of all stages, the heat switch between the main thermal bath and the first ADR stage is opened and the first ADR stage is demagnetized, hence its temperature is lowered. Once all ADR stages reach the final temperature of the first ADR stage, the next heat switch is opened and the remaining ADR stages are cooled to the final temperature of the next ADR stage. This procedure is repeated for all available ADR stages. Alternatively, any lower ADR stage can be isothermally magnetized at the temperature of a preceding ADR stage. After the cooling power of the final ADR stage is depleted, the system warms up to the temperature of the main thermal bath (e.g. 4 K) and the ADR stages have to be remagnetized.

Continuous operation using three or more ADR stages: The ADR stages are magnetized in a cascading manner. While the last ADR stage is used for temperature control of the sample stage, it is regenerated by the preceding ADR stage(s) at a defined temperature to keep the sample temperature stable. Once the last ADR stage is regenerated, the preceding ADR stage is regenerated by its own preceding ADR stage. This proceeds up to the first ADR stage, which is connected to the main thermal bath.

For all above mentioned operating modes, the magnetization heat of each individual ADR stage may also be used to achieve heating of the last ADR stage and the sample stage attached to it.

Figure 1B:
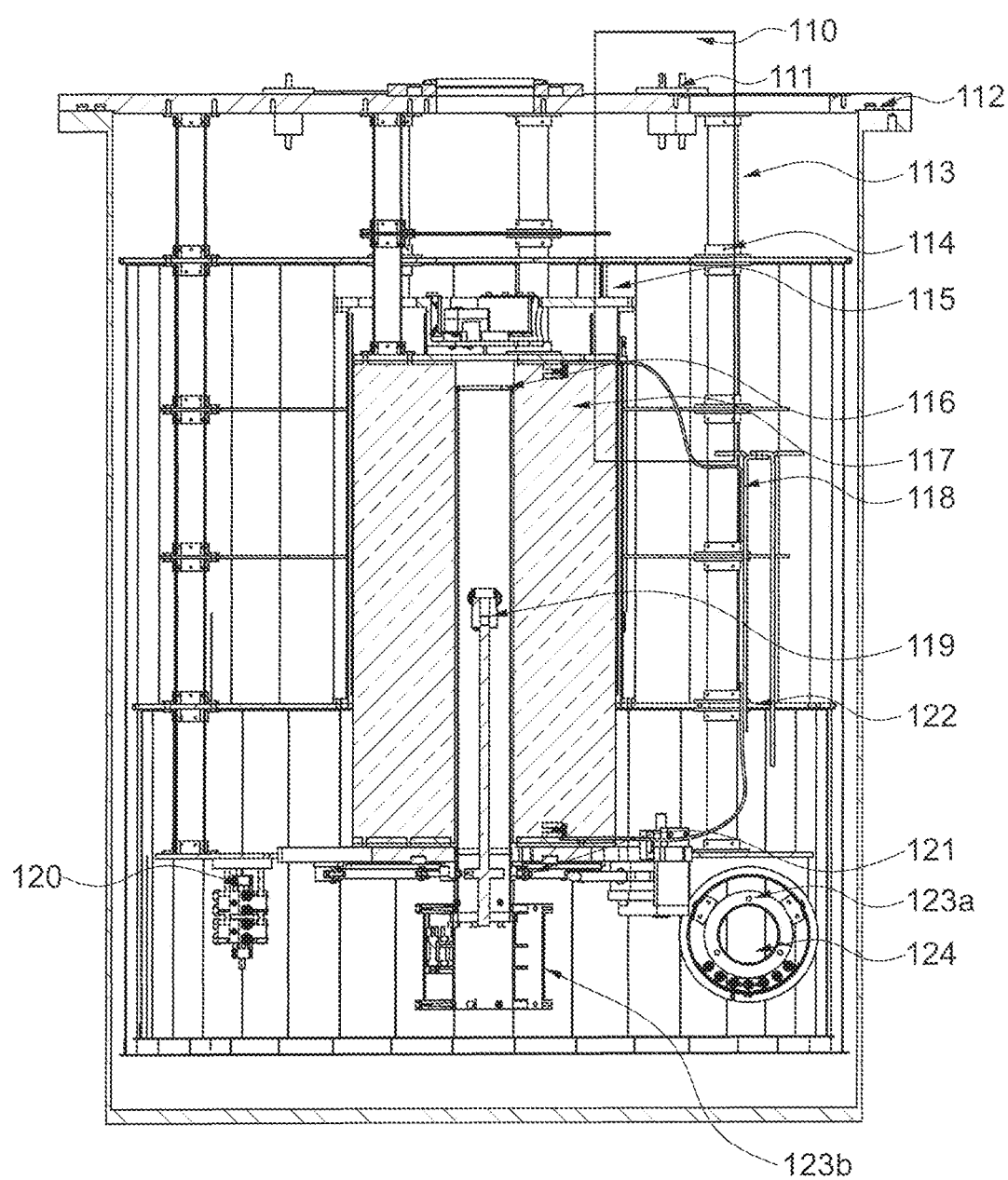

FIG. 1b shows a drawing of an embodiment of a cooling apparatus. It comprises a mechanical two-stage first cooling device 110, e. g. a pulse tube cooler, which is mounted in a vacuum vessel 112. The vacuum vessel 112 has multiple openings 111, which may serve as feedthroughs for wiring, optical fibers, or transmission shafts. A first radiation shield 114 is suspended from the top of the vacuum vessel 112 by low thermal conductivity struts 113. The first radiation shield 114 is thermally anchored to a first stage of the first cooling device 110. A second radiation shield 122 is thermally anchored to a second stage of the cooling device 110 by a thermal bus 118 and suspended from the top of the first radiation shield 114 using low thermal conductivity struts 113. The second radiation shield 122 surrounds a second cooling device, which, in this embodiment, is a multi-stage ADR. In the interest of clarity only two magnets, 123a and 123b, and a heat switch 120 are shown. The magnets may be mounted such that their main magnetic field is oriented parallel (magnet 123a) or perpendicular (magnet 123b) with respect to the wall of the vacuum vessel 112. A refrigerant is arranged inside a magnet bore 124. It may be suspended inside the magnet bore 124 on thin strands of fiber, e.g. Aramid fibers (e.g. Kevlar), to minimize the thermal leak. The sample stage (see FIG. 2 for details) comprises an ultra-low temperature stage 119 and a sample radiation shield 116. The ultra-low temperature stage 119 is cooled by the second cooling device and may be mechanically secured using a sample stage locking device 121 to allow for higher forces and torques on the ultra-low temperature stage 119 during loading of a sample. Therefore, a sample can be loaded directly into the running system without warm up or disassembly. The sample is loaded directly into the insulation vacuum to avoid heat leaks caused by a second vacuum vessel inside the apparatus. In order to avoid radiation heat leaks, the loading slot can be closed when not loading a sample, e. g. using baffles mounted onto the first radiation shield 114 and the second radiation shield 122. The ultra-low temperature stage 119 is mounted inside of the sample radiation shield 116 by means of a mechanical suspension of low thermal conductivity. The sample stage is mounted inside a sample magnet 117 by means of high modulus fibers of low thermal conductivity, e.g. Polyaramid fibers. The sample magnet 117 is attached to the vacuum vessel 112 by low thermal conductivity struts. The sample magnet 117 can either be made from a conventional low temperature superconductor (e.g. cooled to 4 K) or from a high temperature superconductor (e.g. cooled to 40 K).

Figure 2:
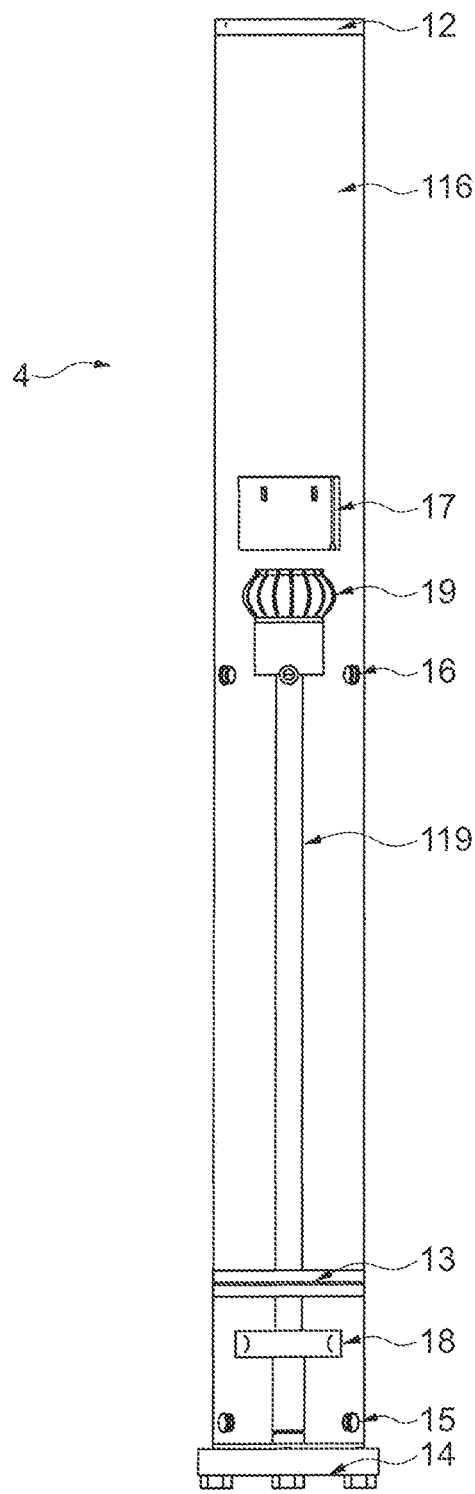

FIG. 2 shows the sample stage 4. The sample stage 4 comprises a sample radiation shield 116, inside of which the ultra-low temperature stage 119 is arranged. One or more samples may be arranged on the ultra-low temperature stage 119. The sample radiation shield 116 is mounted inside the vacuum vessel by rings 12, 13 using a plurality of thin (e.g. 0.02 mm thick) high modulus fibers (e.g. Aramid fiber like Kevlar) and thermally anchored to a higher temperature ADR stage. The ultra-low temperature stage 119 is mounted inside the radiation shield 116 using a strain mechanism 14 which is used to apply tension to thin (e.g. 0.02 mm thick) high modulus fibers (e.g. Aramid fibers like Kevlar) running from the strain mechanism 14 through holes 15, 16 to the ultra-low temperature stage 119.

A sample holder 17 can be moved from outside the cooling apparatus through an opening of the sample radiation shield 116 by a removable external manipulator (not shown). Thermal contact to the ultra-low temperature stage 119 and mechanical stabilization of the ultra-low temperature stage 119 is established by first introducing shafts 25 (see FIG. 3) through holes 18 and thereby locking it. Once locked, the manipulator is used to push the sample holder 17 onto a spring 19. Alternatively, a screw can be used to hold the sample holder 17 on the ultra-low temperature stage 119. The external manipulator is then removed. To minimize heat flow into the ultra-low temperature stage 119, the sample stage lock is then opened.

The sample radiation shield 116 has the form of a cylinder. The sample radiation shield 116 has three holes 18 which are arranged in a common plane. The holes 18 are evenly separated from each other. The sample radiation shield 116 may be made of a material having a high thermal conductivity, e.g. high-purity metals such as copper, silver, and gold. The shield may additionally be covered with a superinsulation foil to further reduce the radiation heat.

Figure 3:
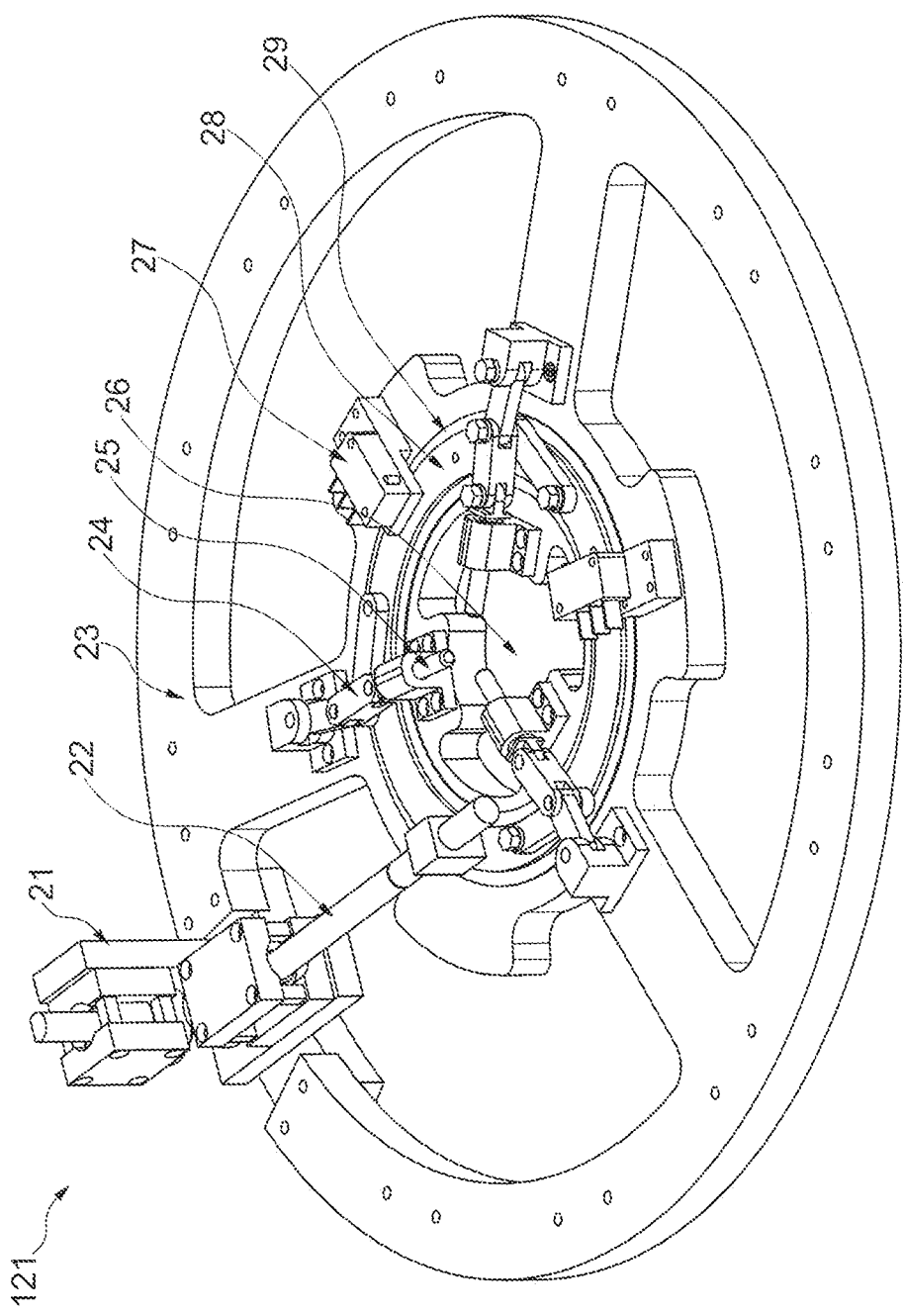

FIG. 3 shows a sample stage locking device 121. The sample stage locking device 121 is used to absorb forces and torques during loading of the sample holder 17 on the ultra-low temperature stage 119 and during removing of the sample holder 17 from the ultra-low temperature stage 119. In order to avoid heat leaks, the sample stage locking device 121 shall not touch the sample stage 4 in an unlocked status. The sample stage locking device 121 has to work at low temperature (e.g. 4 K) and may not produce excessive heating when operated. Self-lubricating bearings may be used for the shafts and lever joints to decrease friction and, consequently, decrease heating during operation. Self-lubricating bearings may be made, e. g. of Teflon, PEEK, or Vespel.

The sample stage locking device 121 comprises an inner region 26. The sample stage 4 (see FIG. 2) can be locked by turning a taper bearing 21 by an outside shaft. This results in rotation of a main shaft 22, which in turn moves a ring 28. The ring 28 moves toggle levers 24 resulting in a movement of the shafts 25 towards the inner region 26, fixing the sample stage 4 in place. A stop element 27 provides a stopping contact. The ring 28 is mounted in a self-lubricating shell 29 to facilitate movement at low temperatures. The whole assembly is mounted on a main ring 23 made of a high thermal conductivity material. The ring may be made of a variety of materials, e.g. aluminum, brass, or copper. All moveable parts need to be machined such that movement is still possible even at low temperatures.

Figure 4:
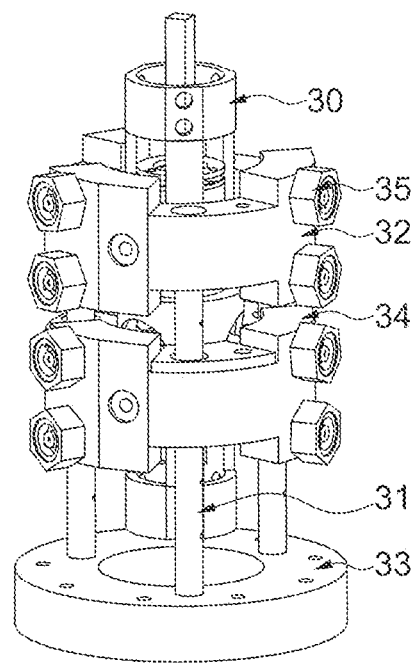

FIG. 4 shows one embodiment of a mechanical heat switch for connecting the ADR stages. To make the ADR principle work, one needs to thermally decouple the ADR stages from each other when magnetizing or demagnetizing, i.e. warming or cooling, respectively. Therefore, a heat switch is needed to disconnect two thermal baths, which may or may not be at the same temperature. The switching process is driven mechanically; hence a mechanical contact is a thermal one. However, it is possible to attach the mechanical heat switch assembly to a higher temperature stage (e.g. 4 K) and to operate the switch between two lower temperature stages while minimizing the thermal leak to the low temperature stages. This enables the usage of the heat switch in ultra-low temperature ADR stages.

A thermal contact can be established between a first thermal bath 30 and a second thermal bath 31, which can be of the same or of different temperatures. The first thermal bath 30 is fixed in a first suspension 32 by means of mechanical suspension of low thermal conductivity. The first suspension 32, in turn, is held by a base plate 33. The second thermal bath 31 is fixed in a second suspension 34, which is attached to the first thermal bath 30. Minimal thermal conductance between the second thermal bath 31 and the second suspension 34 is achieved by anchoring the second suspension at the first thermal bath using very thin (e.g. 0.02 mm thick) high modulus fibers (e.g. Aramid fibers like Kevlar). The fibers are tightened by a strain mechanism 35. The setup allows the temperature of the base plate 33 to be different from the temperatures of first and second thermal baths 30, 31, while producing a minimal heat leak through the fiber suspension.

Figure 5:
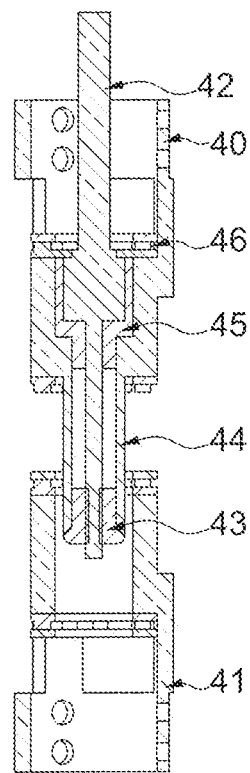

FIG. 5 shows the principle of the mechanical heat switch between the first thermal bath 30 and the second thermal bath 31. A connection between a first thermally conductive part 40 and a second thermally conductive part 41 can be established by turning a pulling shaft 42, which results in a contact component 43 moving towards the first thermally conductive part 40 and thereby pressing a flexible part 44 of the first thermally conductive part 40 against the second thermally conductive part 41. Disconnecting can be achieved by turning or releasing the switching shaft 42 in the other direction, which results in the contact component 43 moving towards the second thermally conductive part 41, allowing the flexible part 44 to relax and assume its former position. The switching shaft 42 is mounted in a self-lubricating bearing 45 (e.g. made of PEEK—Polyether ether ketone). The first and second thermally conductive parts 40, 41 each are suspended at two points 46 to allow for 3-dimensional adjustment regarding each other.

Figure 6:
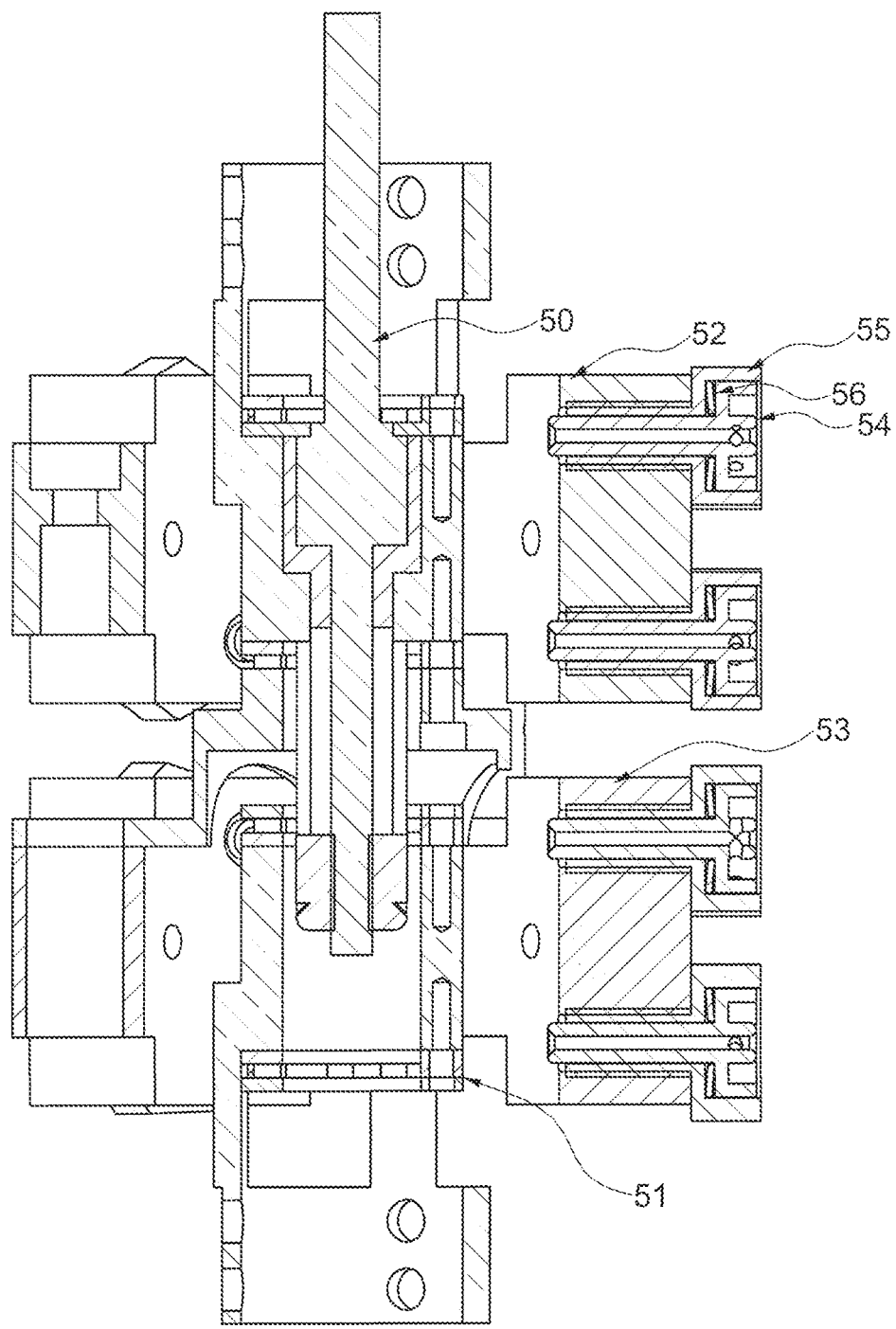

FIG. 6 shows a suspension mechanism of the heat switch of FIG. 4. A first thermal bath 50 and a second thermal bath 51 are suspended in a first suspension 52 and a second suspension 53, respectively, by fibers (e.g. Aramid fibers). The fibers are glued to a glue contact 54 which is arranged inside a screw 55 inside the first suspension 52. The fibers can be tightened by screwing the screw 55 out of the first suspension 52. Initial tension is supplied by a spring washer 56. The suspension may exhibit a three-fold rotational symmetry around the central components 50 and 51.

To homogenously magnetize or demagnetize the refrigerant of an ADR stage (e.g. a salt pill), a superconducting magnet may be used. The magnetic field profile provided by the magnet should be constant over the entire volume of the magnetocaloric material which serves as a refrigerant. In this embodiment a triple Helmholtz design of the primary coil of the magnet was chosen such as to minimize field gradients. The dimensions of the magnet fit the geometry of the salt pill perfectly. To reduce stray fields along the coil axes to manageable levels, a single cylindrical compensation coil was designed around the primary coil.

Figure 7:
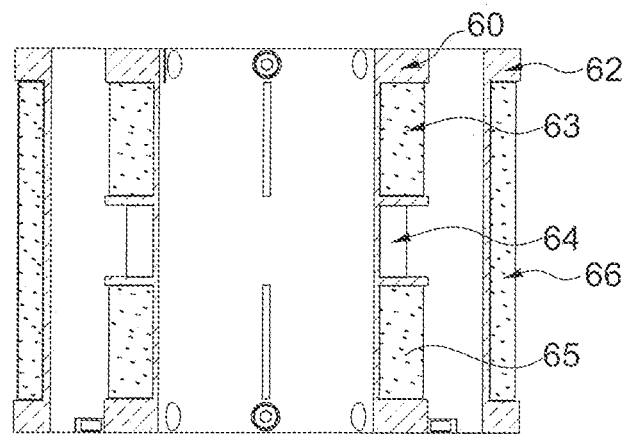

FIG. 7 shows a schematic cut along the axes of a superconducting magnet. An aluminum primary coil-former 60 is designed in a triple Helmholtz geometry. The coil-former 60 may also be made of stainless steel. The Helmholtz design comprises three coil parts 63, 64, 65 which form the primary coil. The first coil part 63 and the second coil part 65 are identical. In the center between the first and the second coil part 63, 65, a third coil part 64 is arranged. The third coil part 64 has a different winding number than first and second coil parts 63, 65. The primary coil parts 63, 64, 65 are wound on the primary coil-former 60 and mechanically supported by spacers 80 (FIG. 9) assembled in a compensation coil-former 62 around it. The compensation coil-former 62 may, e.g., be made of aluminum or stainless steel. A single wire of NbTi:Cu multifilament superconductor material in a Cu-Matrix can be used to wind the primary coil parts 63, 64, 65. NbTi:Cu multifilament superconductor material may also be used for the compensation coil 66 but wound in a direction opposite to the winding of the first, second and third coil parts 63, 64, 65.

Figure 8:
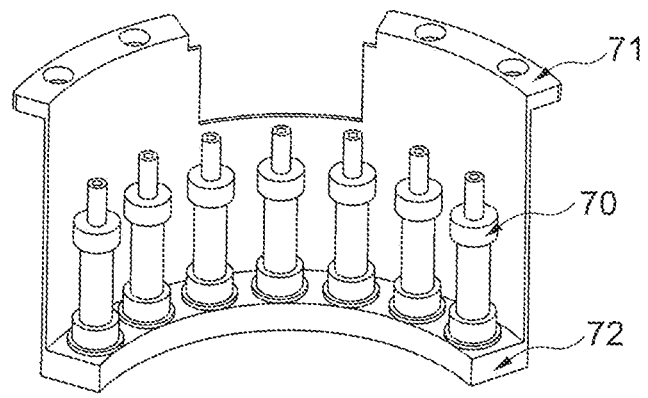

To drive the whole magnet with only one power supply, special joints are needed to link the different coils with each other. FIG. 8 shows a schematic view of this principle. In the geometry chosen seven solder joints 70 are mechanically suspended in the compensation coil-former 62 by an aluminum support 71, but with the requirement to be electrically isolated from it using aluminum oxide spacers 72.

Figure 9:
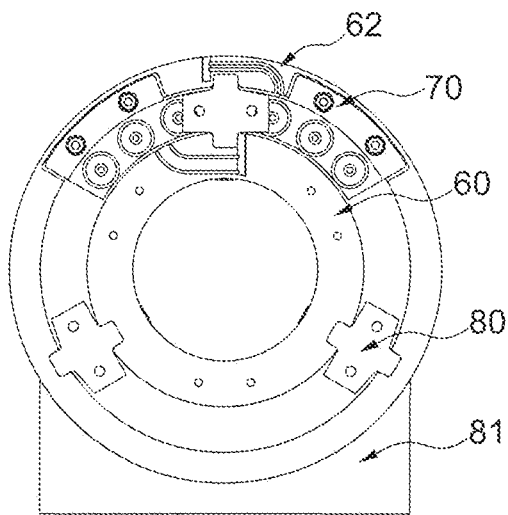

The magnet assembly as a whole is shown in FIG. 9. The compensation coil former 62 is used as mechanical anchor of the setup, which is usually kept at a temperature of 4 K to cool the NbTi:Cu material to its superconducting phase. The solder joints 71 as well as the primary coil-former 60 are attached to the compensation coil-former 62. The primary coil-former 60 is supported by spacers 80 made of aluminum or stainless steel. A special suspension 81 makes it possible to use the magnet assembly horizontally, e.g. in a cryostat combined with a sample load mechanism.

In ADR technology, the refrigerant may be provided in form of a so-called salt pill. The salt pill is used to store magnetocaloric materials and to thermally connect them to a thermal bus. Following, a salt pill design is disclosed which provides optimal filling factor as well as very high thermal conductivity. Simultaneously, the thermal bus can be connected on both sides of the salt pill to allow for flexibility in cooling device design.

Figure 10:
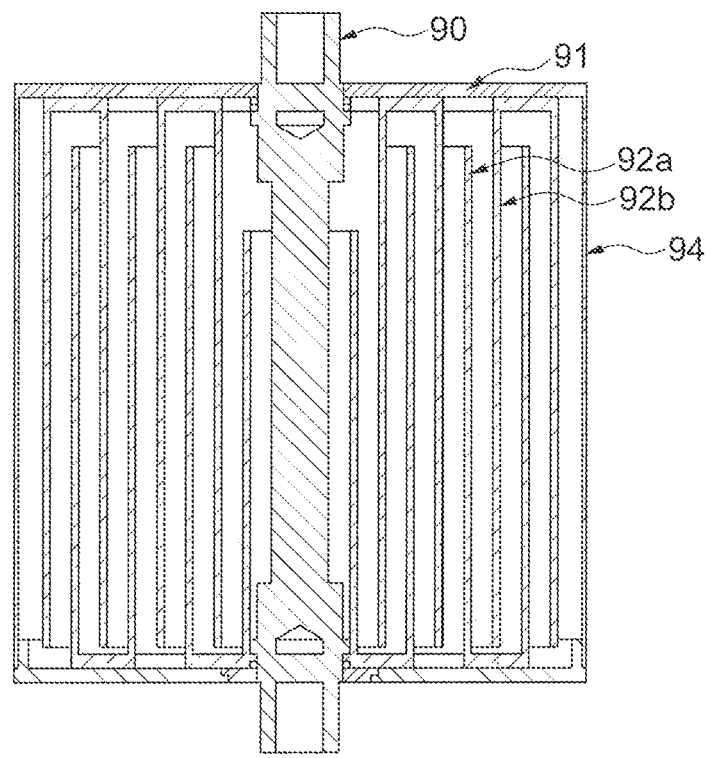

FIG. 10 shows a salt pill suitable for the cooling device disclosed herein. The salt pill can also be used in other cryostats based on the ADR principle. The salt pill comprises a main thermal bus 90, which can be connected to other components on both sides of the salt pill. Thermal matrices 92a, 92b, each made from a single piece of high conductivity copper, are welded to the main thermal bus 90. Thermal matrices 92a, 92b can comprise slits to reduce eddy-current heating during magnetization or demagnetization of the ADR refrigerant. The salt pill is enclosed by a stainless steel case 94, welded to the main thermal bus 90. After introducing the magnetocaloric material into the case 94 (usually by growing crystals inside), the case 94 is sealed by welding a stainless steel lid 91 to the case 94.

Figure 11:
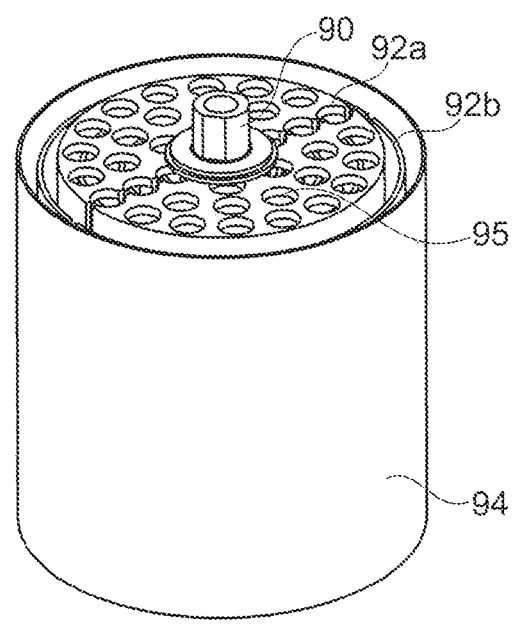

FIG. 11 shows holes 95 in the thermal matrix 92a used to introduce the magnetocaloric material.

Figure 12:
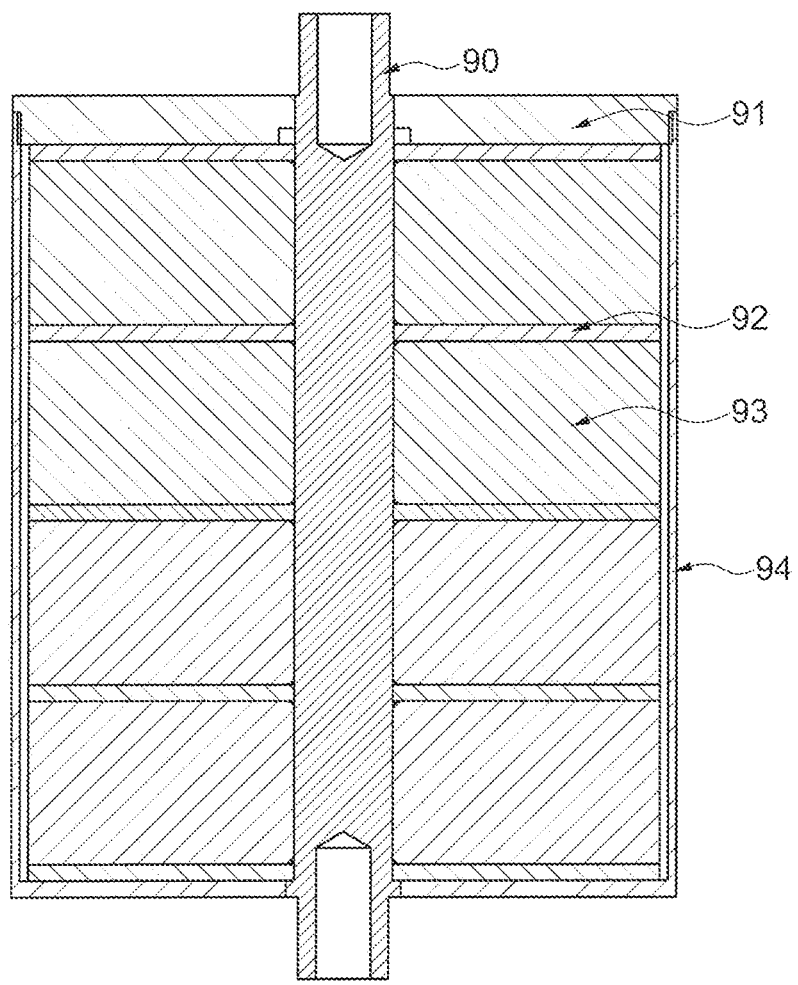

FIG. 12 shows another embodiment of a salt pill suitable for the cooling device. The salt pill can be used with other ADR-based cryostats. The salt pill comprises a main thermal bus 90 made of high thermal conductivity copper or silver. A stainless steel container 94 is welded to the main thermal bus 90. It can be sealed by welding the stainless steel lid 91 to the main thermal bus 90. Inside the container 94, a solid magnetocaloric material 93 is interspersed with high conductivity copper or silver plates 92 providing thermal coupling. The plates 92 are welded directly to the main thermal bus 90 during assembly.

The features disclosed in the specification, the claims and the figures can be relevant for the implementation of embodiments either alone or in arbitrary combination with each other.

We claim:

1. A cryogen-free cooling apparatus for cooling a sample, comprising:
   a vacuum chamber providing a main thermal insulation vacuum,
   a first cooling device arranged in the main thermal insulation vacuum, the first cooling device being configured to generate a first temperature in the vacuum chamber to provide a main thermal bath,
   a second cooling device arranged in the main thermal insulation vacuum,
   a sample stage configured to directly couple to a sample, wherein the sample stage is arranged directly in the main thermal insulation vacuum and fluidly immersed in the main thermal insulation vacuum, wherein the second cooling device is in connection with the sample stage,
   wherein the second cooling device is a solid state cooler which is configured to provide a second temperature to the sample stage, and wherein the second temperature is different from the first temperature, and
   a sample loading device which is configured to change the sample on the sample stage inside the main thermal insulation vacuum while operating the first cooling device and the second cooling device, wherein the sample stage is held in the vacuum chamber and in the main thermal insulation vacuum by a first mechanical suspension of low thermal conductivity such that the sample stage is thermally decoupled from the main thermal bath.

2. The cooling apparatus of claim 1, further comprising a sample stage pre-cooling device which is configured to provide a thermal link to the main thermal bath while the sample is changed.

3. The cooling apparatus of claim 1, wherein the second cooling device is a magnetic cooler, an adiabatic demagnetization refrigerator, a barocaloric refrigerator, or a thermoelectric cooler.

4. The cooling apparatus of claim 1, wherein one or both of the first cooling device and the second cooling device are multi-stage cooling devices.

5. The cooling apparatus of claim 1, wherein the second cooling device is provided in a modular assembly.

6. The cooling apparatus of claim 1, further comprising a sample magnet which is configured to provide a magnetic field at the sample stage.

7. The cooling apparatus of claim 1, further comprising a sample radiation shield which surrounds the sample stage, wherein the sample radiation shield is held in the vacuum chamber by a second mechanical suspension of low thermal conductivity such that the sample radiation shield is thermally decoupled from the main thermal bath.

8. The cooling apparatus of claim 7 wherein the second mechanical suspension is provided by a plurality of second fibers.

9. The cooling apparatus of claim 1, wherein the second cooling device is an adiabatic demagnetization refrigerator which comprises a refrigerant and a superconducting magnet, wherein the superconducting magnet comprises several coils such as to minimize field gradients over the volume of the refrigerant.

10. The cooling apparatus of claim 9, wherein the second cooling device comprises at least one compensation coil which is configured to reduce stray fields of the superconducting magnet.

11. The cooling apparatus of claim 1, wherein a solid refrigerant of the second cooling device is arranged in a case having a bottom and a sidewall, wherein the case is formed in a one-piece design and is sealed by a lid.

12. The cooling apparatus of claim 1, wherein the first cooling device is a mechanical cooling device.

13. The cooling apparatus of claim 1, wherein the sample loading device is configured to change the sample while operating the second cooling device.

14. The cooling apparatus of claim 1, wherein the first mechanical suspension is provided by a plurality of first fibers.

* * * * *